(12) United States Patent
Atac et al.

(10) Patent No.: US 12,242,074 B2
(45) Date of Patent: *Mar. 4, 2025

(54) METHODS AND SYSTEMS FOR AUTO-ALIGNMENT OF DISPLAYS

(71) Applicant: THALES DEFENSE & SECURITY, INC., Clarksburg, MD (US)

(72) Inventors: Robert B. Atac, Batavia, IL (US); Richard Madison, Bedford, MA (US); James E. Melzer, Encinitas, CA (US)

(73) Assignee: THALES DEFENSE & SECURITY, INC., Clarksburg, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,971

(22) Filed: Nov. 27, 2023

(65) Prior Publication Data
US 2024/0184123 A1 Jun. 6, 2024

Related U.S. Application Data

(63) Continuation of application No. 18/046,696, filed on Oct. 14, 2022, now Pat. No. 11,867,913, which is a
(Continued)

(51) Int. Cl.
*G02B 27/01* (2006.01)
*B64D 11/00* (2006.01)
*G01C 21/10* (2006.01)

(52) U.S. Cl.
CPC ...... *G02B 27/0176* (2013.01); *B64D 11/0015* (2013.01); *G01C 21/10* (2013.01); *G02B 27/017* (2013.01); *G02B 2027/0198* (2013.01)

(58) Field of Classification Search
CPC .................... G05B 2219/35482; G05B 27/01
See application file for complete search history.

(56) References Cited

U.S. PATENT DOCUMENTS

| 9,891,705 | B1 | 2/2018 | Lahr et al. |
| 11,300,649 | B1 * | 4/2022 | Lacaze ...................... G01S 5/14 |

(Continued)

OTHER PUBLICATIONS

International Search Report and the Written Opinion issued by the International Searching Authority in International Patent Application No. PCT/US2020/046360, dated Oct. 29, 2020.
(Continued)

*Primary Examiner* — Roy P Rabindranath
(74) *Attorney, Agent, or Firm* — ArentFox Schiff LLP

(57) ABSTRACT

A method, medium and system for auto-aligning displays of a head/helmet mounted display. The method, medium and system may provide for an auto-alignment of components of a headband, headgear, or a helmet. The method, medium and system may provide for a first sensor mounted to the helmet of a user and configured to communicate and transfer align with a vehicle comprising an inertial navigation system (INS). The method, medium and system may provide for display comprising a second sensor configured to communicate with the first sensor and transfer align the second sensor with the first sensor based on the transfer alignment of the first sensor with the vehicle. The method, medium and system may provide for wherein the first sensor and the second sensor comprise an inertial measurement unit (IMU). Further, the method, medium and system may also provide for the aligning of two displays on the head/helmet relative to each other in real time.

20 Claims, 5 Drawing Sheets

Related U.S. Application Data continuation of application No. 16/992,788, filed on Aug. 13, 2020, now Pat. No. 11,487,124.

(60) Provisional application No. 62/886,778, filed on Aug. 14, 2019.

(56) References Cited

U.S. PATENT DOCUMENTS

| | | | |
|---|---|---|---|
| 11,487,124 B2 * | 11/2022 | Atac | G01C 21/10 |
| 11,867,913 B2 * | 1/2024 | Atac | G02B 27/0176 |
| 2008/0048931 A1 * | 2/2008 | Ben-Ari | G01S 5/163 |
| | | | 345/8 |
| 2015/0001381 A1 | 1/2015 | Shimon et al. | |
| 2015/0002375 A1 | 1/2015 | Williams | |
| 2015/0317838 A1 | 11/2015 | Foxlin | |
| 2017/0169627 A1 | 6/2017 | Kim et al. | |
| 2017/0352190 A1 | 12/2017 | Calloway | |
| 2018/0007252 A1 | 1/2018 | Tuulos et al. | |
| 2018/0185734 A1 | 7/2018 | Kennard et al. | |
| 2018/0299271 A1 | 10/2018 | Calloway | |
| 2018/0330527 A1 | 11/2018 | Corcoran | |
| 2019/0041980 A1 | 2/2019 | Trythall et al. | |
| 2019/0133232 A1 | 5/2019 | Olivares Velasco | |

OTHER PUBLICATIONS

European Examination Report issued by the European Patent Office in corresponding European Patent Application No. 20 853 094.9, dated Dec. 17, 2024.

* cited by examiner

METHODS AND SYSTEMS FOR AUTO-ALIGNMENT OF DISPLAYS

CROSS-REFERENCE TO RELATED APPLICATIONS

This application is a continuation of U.S. patent application Ser. No. 18/046,696, filed Oct. 14, 2022, which is a continuation of U.S. patent application Ser. No. 16/992,788, filed Aug. 13, 2020, which claims the benefit of priority from U.S. Provisional Application No. 62/886,778, filed on Aug. 14, 2019. The contents of the prior application are incorporated herein by reference in their entirety.

BACKGROUND

Field

Aspects of the present disclosure relate generally to auto-alignment of displays, e.g., as used in head- or helmet-mounted displays (HMDs).

Background

The alignment or re-alignment of displays (interchangeably referred to herein as tracker-to-display alignment or re-alignment), for example HMDs, is challenging when a display is moved/adjusted by a user either accidently or on purpose. For example, it is difficult to efficiently and/or inexpensively align or re-align a pilot's or user's HMD during the flight of an aircraft, vehicle, or in the course of a mission or activity.

To properly display symbols positioned accurately on the HMD, it is necessary to know the alignment of the HMD within the head/helmet frame of reference. A problem with some types of HMDs however, is that the alignment of the HMD with the head/helmet cannot be determined prior to use and may even change during use. For example, in some systems the display is injected into the field of view of night vision goggles (NVGs). The mounting of NVGs is normally such that they can be positioned at varying angles relative to the head/helmet and may be repositioned from time to time by the user, leading to unpredictable changes in the HMD alignment line of sight. In addition to NVGs, there are other types of HMDs which clip onto a headband, headgear, or helmet and/or which allow the user to adjust the physical alignment, again leading to unpredictable alignment of the display with the head/helmet reference frame.

One related-art approach to calculate HMD alignment is boresighting the HMD to the vehicle/aircraft. Boresighting to the aircraft usually includes aligning an aiming mark displayed on the HMD to a reticle displayed on a Head-Up Display (HUD) or a Boresight Reference Unit (BRU). Generally, a boresighting procedure is performed by a user at the start of a flight and may be repeated several times during a flight. It is important for boresighting to be accurate, otherwise false or misleading (i.e., incorrectly positioned) information could be provided to the user via the HMD.

One method for boresighting requires the user to line up HMD symbology in three axes, namely azimuth, elevation and roll, simultaneously to an aircraft/vehicle mounted BRU or HUD. The BRU or HUD displays a collimated image of a cross or some other type of reticle (i.e., a cross in a rifle sight). The reticle usually consists of a horizontally or vertically extended fiducial, such as a cross, to provide the elevation, azimuth, and roll referenced to the centerline of the vehicle or aircraft. The user is typically required to align a first symbol projected on the HMD onto the line of sight to the intersection of the BRU/HUD displayed cross/reticle. Once the HMD symbol is aligned with the BRU/HUD cross/reticle the user wearing the HMD engages a button. In some cases, fine alignment can also be implemented where the HMD displayed symbol is aircraft/vehicle referenced, and the user may then slew the symbol to overlay on the BRU/HUD cross/reticle. While this alignment process may be considered a relatively easy and straightforward task, it does take time. Further, the user of the HMD may introduce error into the total HMD accuracy by not being careful to precisely align the HMD cross to the BRU/HMD reticle. In the case of a binocular HMD with two displays that both need alignment, this alignment process may still be implemented by a user of the aircraft/vehicle, but it is tedious and subject to error.

An aircraft, and particularly a rotary wing aircraft, is subject to movement and vibration during flight and also prior to take off during engine operation. Such movement and vibration inhibits the ability of an aircraft occupant to make the small head movements required for successful alignment. Even without aircraft movement and vibration, it is not easy to carry out the fine head movements that are required.

Another method for a tracker-to-display alignment is to mount the tracker and the display to a rigid mechanical structure with tight tolerance. Once the structure is loaded with both the tracker and display, a calibration procedure is used to precisely measure the positions of the display and the position of the tracker. With this information, symbols can be properly placed on the HMD. One downside to this method is that precise alignment of the tracker and the display adds significant expense to the overall cost of the design. In addition, expensive manufacturing and calibration equipment is also required. Further, the headband, headgear, or helmet must accommodate the full human anthropometric range in order to place the user's eye in front of the display.

Additionally, the relative alignment of display-to-display, specifically in either a binocular (i.e., two separate displays, where each eye sees a separate and distinct image), or biocular (i.e., two separate displays, where each eye sees the same image) HMD may cause issues. In the horizontal direction, the convergence point determines the binocular viewing distance. It is intended that the symbology, icons or imagery overlays the object of interest at a desired distance. Thus, the horizontal alignment should be within an accepted tolerance value and should not exceed optical infinity. In the vertical direction the displayed symbology, icons or imagery should never exceed a specific angle, regardless of the viewing distance. In addition, the ability to adjust the horizontal convergence angle to the desired viewing distance in real time is desirable, but should be done accurately in both the vertical and horizontal directions. Thus, the relative display-to-display alignment is critical to ensuring that when the pilot or user views the imagery, doing so does not cause double vision or eye strain. One method is to mount the displays on a rigid structure so that in the course of the flight or mission, the displays do not move relative to each other.

There remains an unmet need for an efficient and cost effective method and system that auto aligns HMDs within a reference frame without the need for a rigid structure or aircraft/vehicle mounted BRU/HUD.

SUMMARY

In light of the above described problems and unmet needs, as well as others, aspects of the design, development, and testing of a system and method for auto-alignment of displays is described herein. Among other things, these aspects may be used for, e.g., aircraft HMDs, ground vehicle HMDs, comprising either monocular or binocular displays for a user, and the like.

In an aspect of the disclosure, a method, a computer-readable medium, and a system for auto-alignment of displays are provided. The method, medium and system may provide for an auto-alignment of components of a headband, headgear, or a helmet. Further, the method, medium and system may provide for a first sensor mounted to the headband, headgear, or helmet and configured to communicate and align with a vehicle. Alignment to the vehicle may be implemented using transfer alignment if the vehicle has an inertial navigation or measurement system. Further, the method, medium and system may provide for a display comprising a second sensor configured to communicate with the first sensor and transfer align the second sensor with the first sensor. Further, the first sensor may then be aligned to the vehicle or may have been aligned to the vehicle before aligning to the second sensor. Further, the method, medium and system may further provide for wherein the first sensor and the second sensor comprise an inertial measurement unit (IMU).

The method, medium and system may also provide for a first and second display on a HMD and comprise a third sensor that may transfer align with a first and a second sensor. The third sensor may then be aligned to the vehicle or may have been aligned to the vehicle before aligning to the second and first sensors. Further, the method, medium and system may provide for wherein the first, second and third sensors comprise an inertial measurement unit (IMU).

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Various example aspects of the systems and methods will be described in detail, with reference to the following figures, wherein.

DETAILED DESCRIPTION

Figure 1:
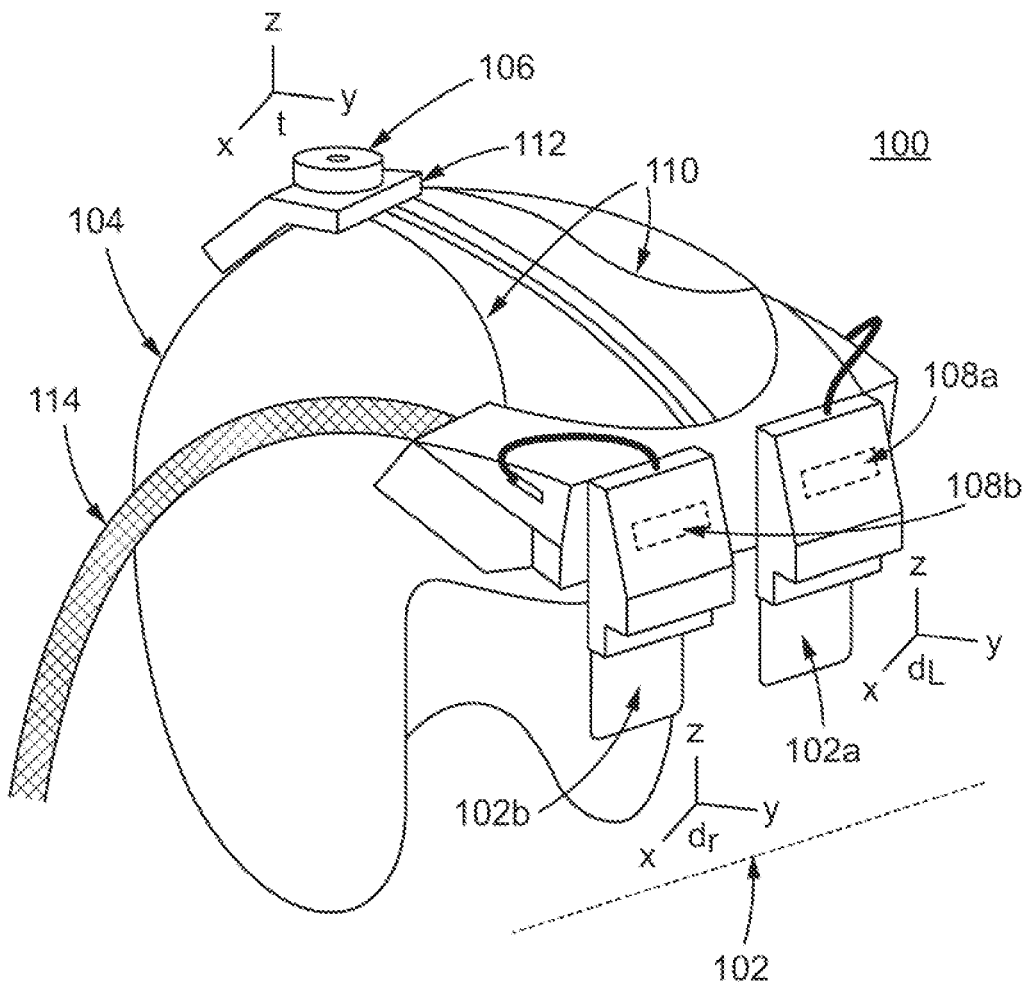
FIG. 1 is diagram illustrating an example system for auto-alignment of displays, in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of motion tracking systems will now be presented with reference to various apparatuses and methods. These apparatuses and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above are also included within the scope of computer-readable media.

Accordingly, in one or more aspects, the functions described below may be implemented in any one of a HMD, or a Head-Worn Display ("HWD"). Further, these terms may also be used interchangeably with the phrase "video display for a user/pilot."

HMDs often require a precise orientation alignment between the helmet/head tracker and each display to allow for accurate calculation of a location of a line of sight from the user in order to properly draw/present/display graphics onto the display. In addition, in the case of a binocular display, two displays must be aligned relative to each other so that lines of sight to a single point, from the user's two eyes, projected onto the two displays, appear at disparity accurate enough to not cause eye strain and thus adversely affect user performance. In another aspect of the disclosure, it is often critical that the tracker-to-display and the display-to-display alignment be maintained during the course of the entire mission.

Referring to FIG. 1, illustrated is a representative diagram of various features of an example auto-alignment of displays system 100 according to an aspect of the present disclosure. System 100 may include dual displays 102a and 102b positioned for a right eye and a left eye of a user, respectively. Displays 102a and 102b may together be referred to as a binocular system 102, referenced herein interchangeably as the display system 102. The binocular system 102 may be mounted on a helmet 104.

In one aspect of the disclosure, the displays 102a and 102b may be see-through HMDs in which the imagery is nominally collimated and verged to infinity. The two displays together provide a binocular display system 102 for the user. With a binocular system 102, the relative binocular alignment should be kept from diverging (i.e., exceeding parallel relative to one another), and should remain within 5 to 10 arcminutes convergent angle relative to infinity or to a desired convergence distance. In the vertical direction, the binocular alignment between the two displays should not exceed 3 to 6 arcminutes. For example, if the HMDs 102a and 102b of the binocular system 102 are out of alignment by more than these example values in either the vertical or horizontal direction, a user may experience adverse effects when using the HMDs, such as double vision, eyestrain, headaches and blurred vision.

Displays 102a and 102b may also each contain and/or be coupled to an inertial measurement unit (IMU) 108a and 108b, respectively. The helmet 104 may also include a tracker 106. The tracker 106, may include, for example, a hybrid optical-based inertial tracker (HObIT), described in more detail below. The tracker 106 may also contain an IMU 112. The IMU contained on the helmet 104 may be, for example, a NavChip™ IMU produced by Thales Visionix® of Clarksburg, MD which is a Microelectromechanical systems (MEMS)-based high-precision IMU.

In one example implementation in accordance with aspects of the disclosure, the tracker 106 may be electrically connected via a transfer wire 110 to the display system 102, comprising the display 102a and/or 102b. In another aspect of the disclosure, the display system 102, comprising the display 102a and/or 102b, may also be electrically connected via a Helmet-Vehicle Interface (HVI) 114 of an aircraft or other vehicle. In another aspect of the disclosure, the tracker 106 and the display system 102, comprising the display 102a and/or 102b, may be electrically connected to the aircraft or other vehicle via a Helmet-Vehicle Interface (HVI) 114. In another aspect of the disclosure each display 102a and 102b of the binocular system 102 may be configured to communicate between each other. Alternatively to the electrical connections described above with reference in FIG. 1, in some implementations, the various components may be wirelessly, optically, or otherwise coupled to one another.

A control unit and image generator (not shown) may receive tracking data relating to the HMD, as described further below, and may communicate a generated image to the HMD via the HVI 114. The control unit may also receive input from a vehicle and/or aircraft's mission computer, including, e.g., symbol data and data from an aircraft Global Positioning System (GPS)/Inertial Navigation System (INS). The helmet 104 along with the tracker 106, and display system 102 may communicate with a control unit, such as a cockpit mounted control unit, through the HVI 114, for example.

As discussed further below, in one aspect of the disclosure, the tracker 106 and the display system 102 may be aligned to each other, and the alignment is maintained throughout the operation of the auto-alignment of displays system 100. As further discussed below, in another aspect of the disclosure the display 102a and the display 102b may be aligned relative to each other, and the alignment may be maintained throughout the operation of the auto-alignment of displays system 100. Any error in the alignments between the display system 102 and the tracker 106 may directly lead to an error in positioning the symbols on the display 102a and/or the display 102b for proper registration with the outside world. Additionally, any error in the alignment between the display 102a and the display 102b may directly lead to an error in positioning the symbols on the display 102a and/or the display 102b for proper registration with the outside world or relative to each other that may induce eye strain in the pilot or user.

Figure 2:
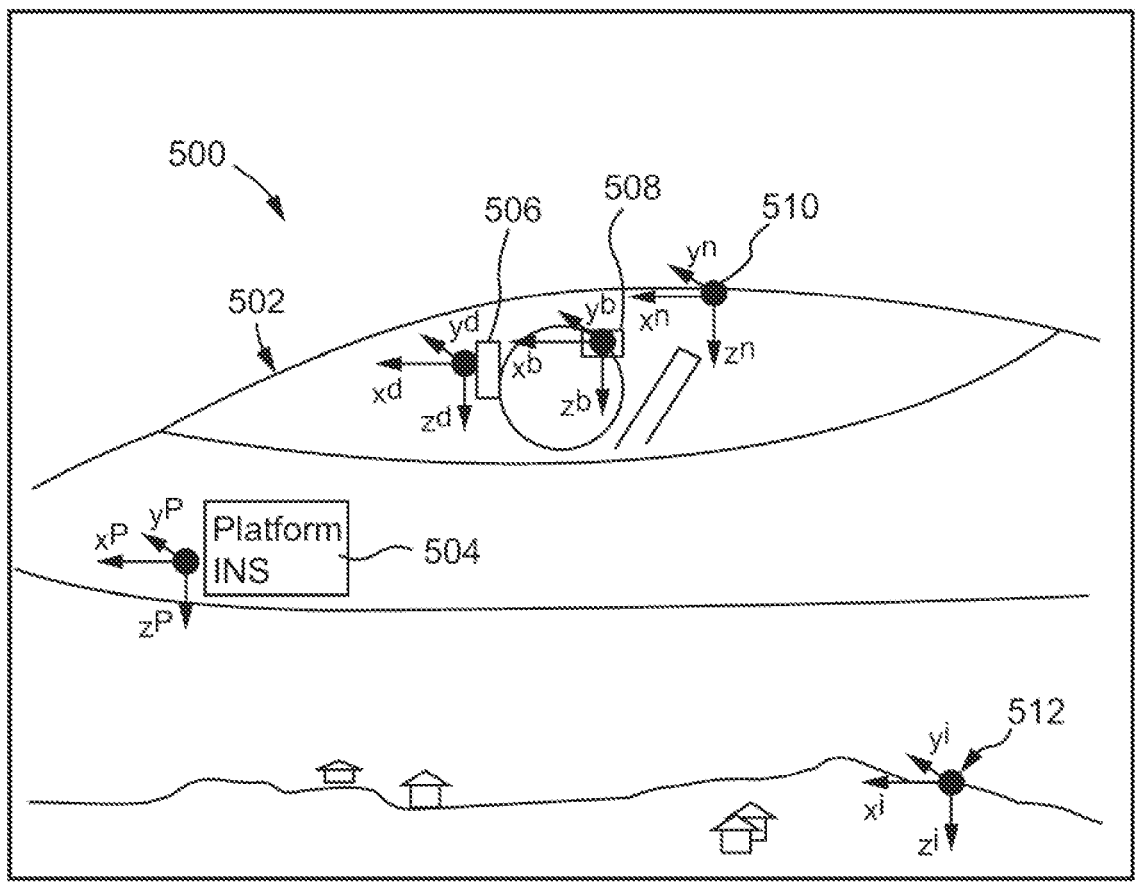
FIG. 2 is an example implementation of a system for auto-alignment of displays, in accordance with aspects of the present disclosure.

Referring now to FIG. 2, illustrated is a representative diagram of an example implementation of various features of a system for auto-alignment of displays, in accordance with aspects of the present disclosure. Specifically, FIG. 2 illustrates an example of a fighter jet cockpit area of an aircraft 500 according to one aspect of the present disclosure. In one aspect of the disclosure, it is often desirable to draw/display/present an icon or symbol onto a display along a line of sight from a user's eye to an object in the world, such that the icon overlaps the object in the user's field of view. In accordance with aspects of the present disclosure, FIG. 2 illustrates example coordinate axes associated with displaying objects, or symbols representing objects, on an HMD. The locations of the objects may be known in the ground coordinate system (i) 512. The platform inertial navigation system (INS) may monitor its own position and orientation (pose) relative to a coordinate system (i), thereby allowing object coordinates to be converted into a Platform coordinate system (p) 504. As illustrated in FIG. 2, a fiducial constellation 510 may be mounted to the canopy 502 and have a coordinate system (n), whose pose relative to coordinate system (p) may be calibrated and used to convert object coordinates from system (p) to system (n). A tracker 508 (106 of FIG. 1) may have a Body coordinate system (b) and may monitor its own pose relative to the fiducial constellation, thereby allowing object coordinates to be converted from system (n) to system (b). Additionally, the display(s) 506 (102a and/or 102b of FIG. 1) may define coordinate system (d). In this example, the combination of transforms may allow an object's location to be converted from ground coordinates (i) to tracker body coordinates (b). In order to determine where a line of sight to an object intersects the display in coordinate system (d), it may be necessary to know the eye and object locations in coordinate system (d). Thus, the eye location in coordinate system (d) may be measured or simply asserted by assuming similar head geometry for all potential users and measuring the position for one user. The object location is known in coordinate system (b). As described below, one aspect of the disclosure is directed to the auto-alignment of coordinate systems b and d, in other words the calculation of the transform between these two coordinate systems, with which an object's coordinates in system (d) may be converted to system (b). Various aspects of the use of a fiducial constellation 510 are discussed throughout U.S. Pat. No.

10,212,355, which is expressly incorporated herein by reference. Further, although only one display 506 is illustrated in FIG. 2, any suitable number of displays may be present. For example, two displays may be present for a binocular system. In accordance with an aspect of the disclosure, Table 1 lists the five associated coordinate frames referenced above.

TABLE 1

| | |
|---|---|
| i-frame | The i-frame is an inertial reference frame, and may be, e.g, a local-level North-East-Down (NED) frame on the ground below the aircraft that rotates sufficiently slowly to be considered an inertial frame. |
| p-frame | The aircraft "platform INS" frame. The "platform INS" is the inertial navigation system that supplies pose data to the mission computer (MC) and in turn to the auto-alignment of displays system. |
| n-frame | The reference frame of the tracking system. For a magnetic tracker the n-frame may have its origin in and axes nominally aligned with a source coil assembly, for example. In one example, the n-frame may have its origin at one of the fiducials and its axes may be roughly aligned to the aircraft axes during ground-harmonization procedures. |
| b-frame | The body frame of the tracker. In one example, the b-frame may be defined by a NavChip ™ IMU inside the tracker, as described above, which may be mounted upside-down, backwards and/or tilted relative to the helmet, for example. |
| d-frame | Display frame of each display. In one example, the d-frame may be defined by a NavChip ™ IMU inside each display, as described above, which may be mounted upside-down, backwards and/or tilted relative to the helmet, for example. |

As described above with reference to FIG. 1, the IMUs 112, 108a and 108b in the tracker 106, the display 102a, and the display 102b, respectively, may provide continuous measuring of the relative orientation to each other, as described in further detail below.

Figure 3:
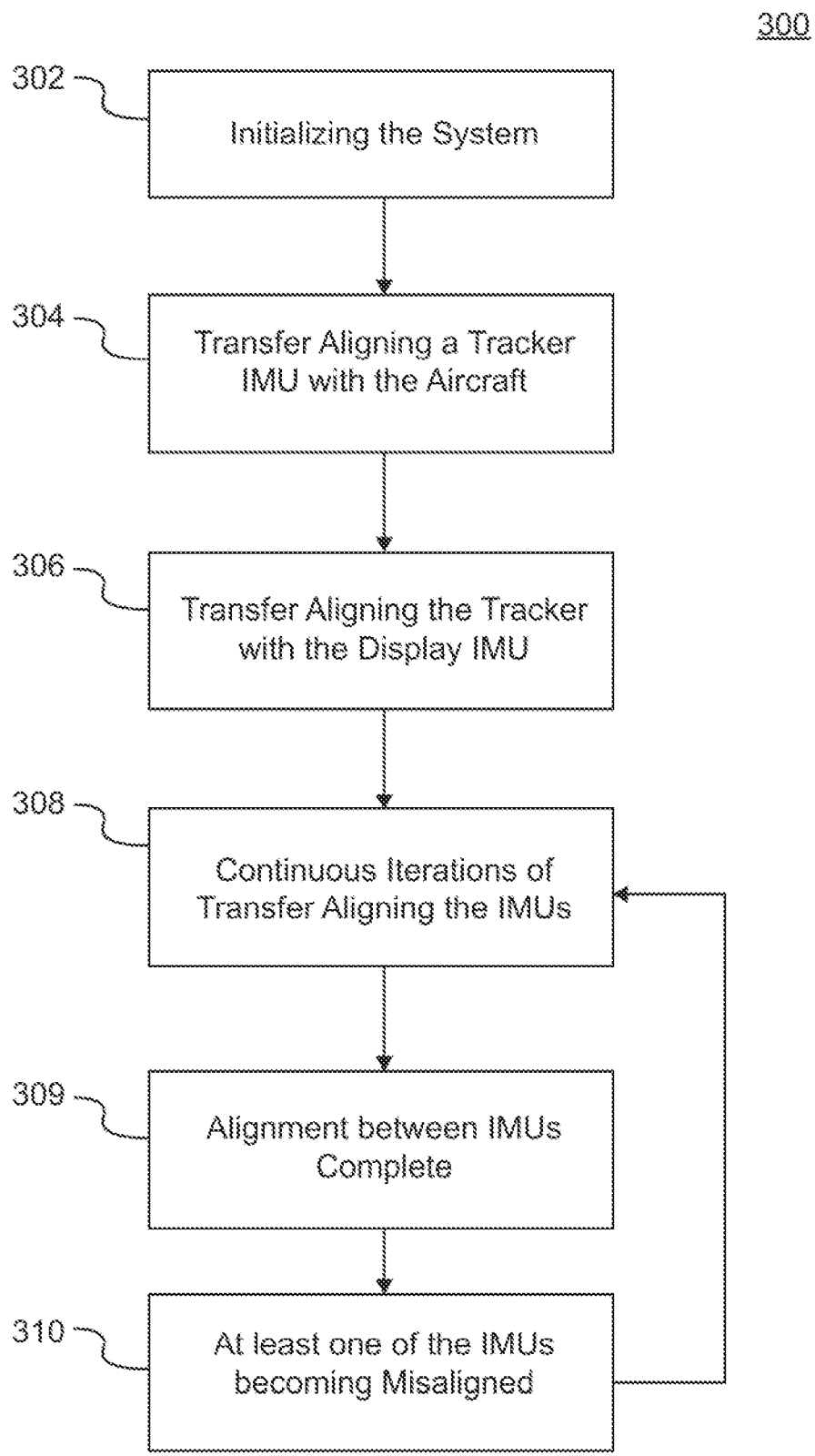
FIG. 3 is an example flowchart for a method for auto-alignment of displays, in accordance with aspects of the present disclosure.

Referring now to FIG. 3, therein shown is an example flowchart for a method for auto-alignment of displays, in accordance with aspects of the present disclosure. Specifically, flowchart 300 for auto-alignment of displays by utilizing a transfer alignment method is shown in accordance with aspects of the present disclosure.

In one aspect of the disclosure, transfer alignment may be defined as the process of determining the transform between two coordinate systems, such that a location in one system may be converted to an equivalent location in the other system. Transfer alignment may operate, for example, roughly as follows. Two navigation devices may be mounted to each other across a fixed but unknown transform (translation and rotation). For example, a missile mounted to an aircraft, a tracker (as shown in FIG. 1, 106) to its IMU (as shown in FIG. 1, 112), or the tracker and display on an HMD (As shown in FIGS. 2, 506 and 508). Regarding FIG. 2, the display 506 may have a coordinate frame d, and the tracker IMU 508 may have a coordinate frame b. The display 506 and the tracker IMU 508 may be physically mounted, and thus may undergo the same rotation over time, but each measures the rotation in its own coordinate frame, as rotation matrices Rd and Rb, respectively. By defining the (unknown but fixed) rotation between the frames as Rdb, the physical linkage may be represented as $Rdb*Rb*Rdb^T=Rd$. For example, if rotations are very small, for instance because they are measured over a short time, they may be approximated as $Rb \approx I+[wb]x$ and $Rd \approx I+[wd]x$, respectively, and the linkage equation reduces to $Rdb*[wb]x*Rdb^T=[wd]x$, where wb and wd are the small rotations represented as rotation vectors. Equivalently, $[Rdb*wb]x=[wd]x$, and therefore $Rdb*wb=wd$. Because Rdb is fixed, several measurement pairs (wb,wd) may be concatenated to matrix equation $Rdb*Wb=Wd$ and Rdb may be found by least squares or other noise-resistant methods. If the measurements have fixed, additive biases (bb,bd), the equation becomes $[Rdb, Rdb*bb-db]*[wb; 1]=wd$, which can also be solved by least squares or other noise-resistant methods to determine Rdb. This approach may be sufficient to determine the rotation between the IMUs of the two displays (as shown in FIG. 1, 108a and 108b), or between a display and a tracker (as shown in FIG. 1, 108a or 108b and 112, respectively), or between a tracker and its IMU (as shown in FIGS. 1, 106 and 112, respectively). Tracker-to-IMU alignment may have the additional advantage that, as the tracker monitors its own orientation (alignment) in some coordinate system, the newly calculated Rdb may be used to calculate the orientation of, or "transfer alignment to" the IMU. An analogous process may also determine translation between two IMUs/trackers.

At block 302, the method 300 may include initializing the system (e.g., system 100 of FIG. 1). The initialization process may including the powering up of the system, for example, turning on the aircraft and the helmet 104, along with the INS of the aircraft obtaining necessary data regarding location, etc.

At block 304, the method 300 may include a tracker (e.g., tracker 106 of FIG. 1), comprising a tracker IMU (e.g., IMU 112 of FIG. 1), transfer aligning with the aircraft's INS. In one aspect of the disclosure, as described above, the tracker may also take advantage of the fiducial constellation mounted to the aircraft's canopy for further alignment, for example. In another aspect of the disclosure, the alignment between the tracker 106 and the aircraft may occur automatically and without interaction from the user, for example. At block 304, the transfer alignment method may also include the use of gravity to align the tracker (e.g., tracker 106 of FIG. 1) to the aircraft.

At block 306, the method 300 may include transfer aligning each display (e.g., displays 102a and 102b of FIG. 1) to the tracker IMU (e.g., IMU 112 of FIG. 1) with the display IMUs (e.g., IMUs 108a and 108b of FIG. 1). This transfer alignment of the display system 102 to the tracker 106 may provide precise orientation alignment of each display 102a and 102b, relative to the tracker 106, for example. The transfer alignment process may be executed in the background during normal operation, and may be invisible to the user. Utilization of the transfer alignment method may avoid the expense of rigid mechanical alignment and installing a boresight reference unit for each seat in the valuable real-estate of the aircraft cockpit, among other advantages. In one aspect of the present disclosure, the display IMUs 108a and 108b may transfer align to each other in addition to or rather than transfer alignment with the tracker IMU 112.

At block 308, along the lines as described above, the method may include the tracker and display IMUs (e.g., IMUs 112, 108a and 108b of FIG. 1) constantly or frequently transfer aligning. Upon movement of the aircraft, the tracker and display IMUs 112, 108a and 108b may become aligned within one 100th of a degree.

At block 309, the transfer alignment between the displays IMUs 112, 108a and 108b is complete.

At block 310, the method may include at least one of the displays (e.g., 102a and 102b of FIG. 1) and/or at least one of the tracker or display IMUs becoming misaligned. This misalignment may occur, for example, due to the helmet 104 getting dropped and/or repositioned by the user, due to the displays being intentionally or accidentally moved away from the user's eyes, or due to mere vibrations of the aircraft, etc. As described above, based on the rate of the transfer alignment between the tracker and display IMUs 112, 108a and 108b and the INS of the aircraft in conjunction with the fiducial constellation, the displays 102a and 102b may automatically become realigned to their respective new positions.

Figure 4:
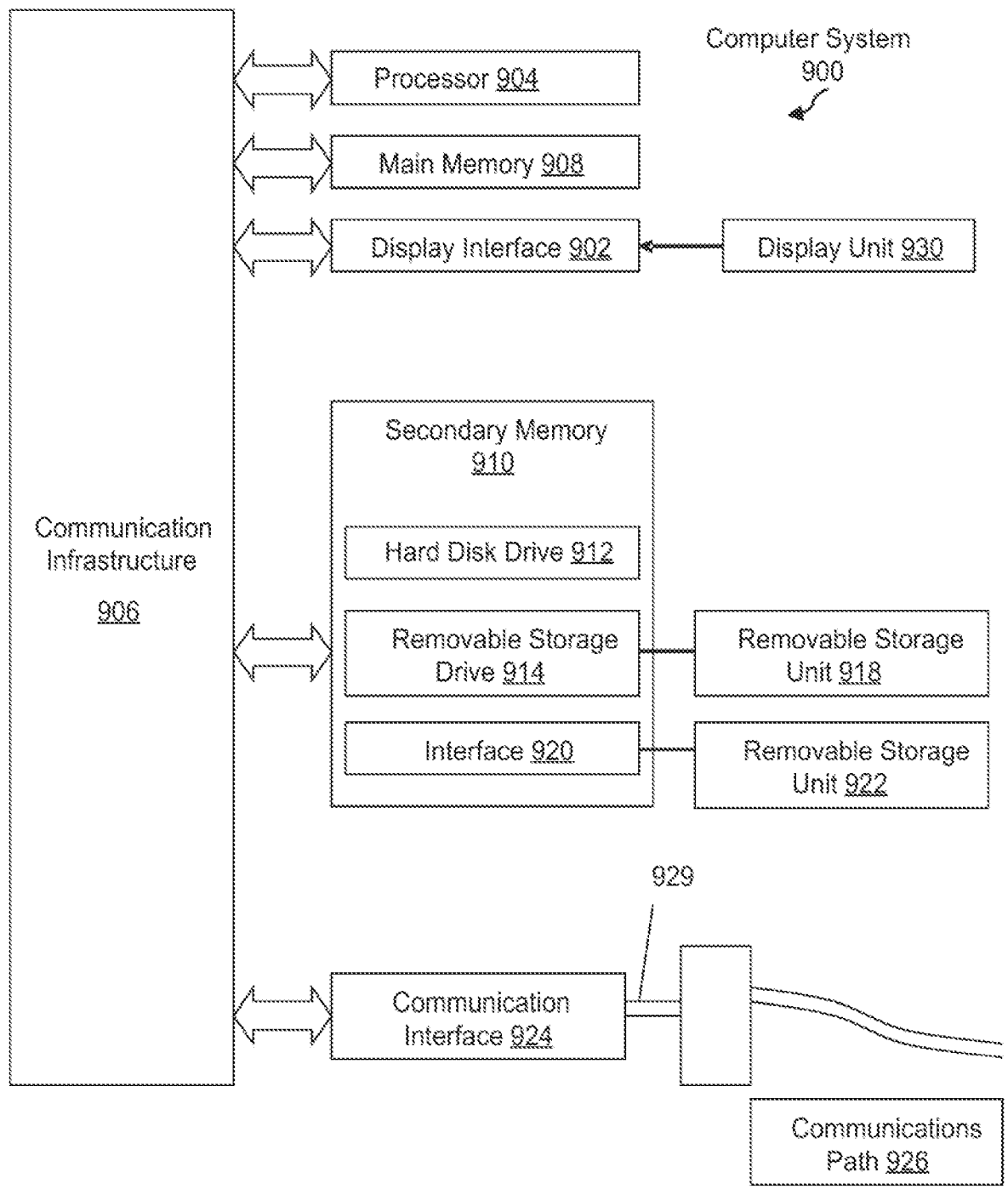
FIG. 4 presents an example system diagram of various hardware components and other features, for use in accordance with aspects of the present disclosure.

FIG. 4 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with one or more of the IMUs, displays, INS, and/or related processing within other components in the helmet of FIGS. 1-3. An example of such a computer system 900 is shown in FIG. 4.

Computer system 900 includes one or more processors, such as processor 904. The processor 904 may correspond to the IMUs described in connection with the auto-alignment of displays system 100. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 929 are provided to communications interface 924 via a communications path (e.g., channel) 926. This path 926 carries signals 929 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 914, a hard disk installed in hard disk drive 912, and signals 929. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 904 to perform the features presented herein. Accordingly, such computer programs represent controllers of the computer system 900.

In aspects implemented using software, the software may be stored in a computer program product and loaded into computer system 900 using removable storage drive 914, hard drive 912, or interface 920 to removable storage unit 922. The control logic (software), when executed by the processor 904, causes the processor 904 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 5:
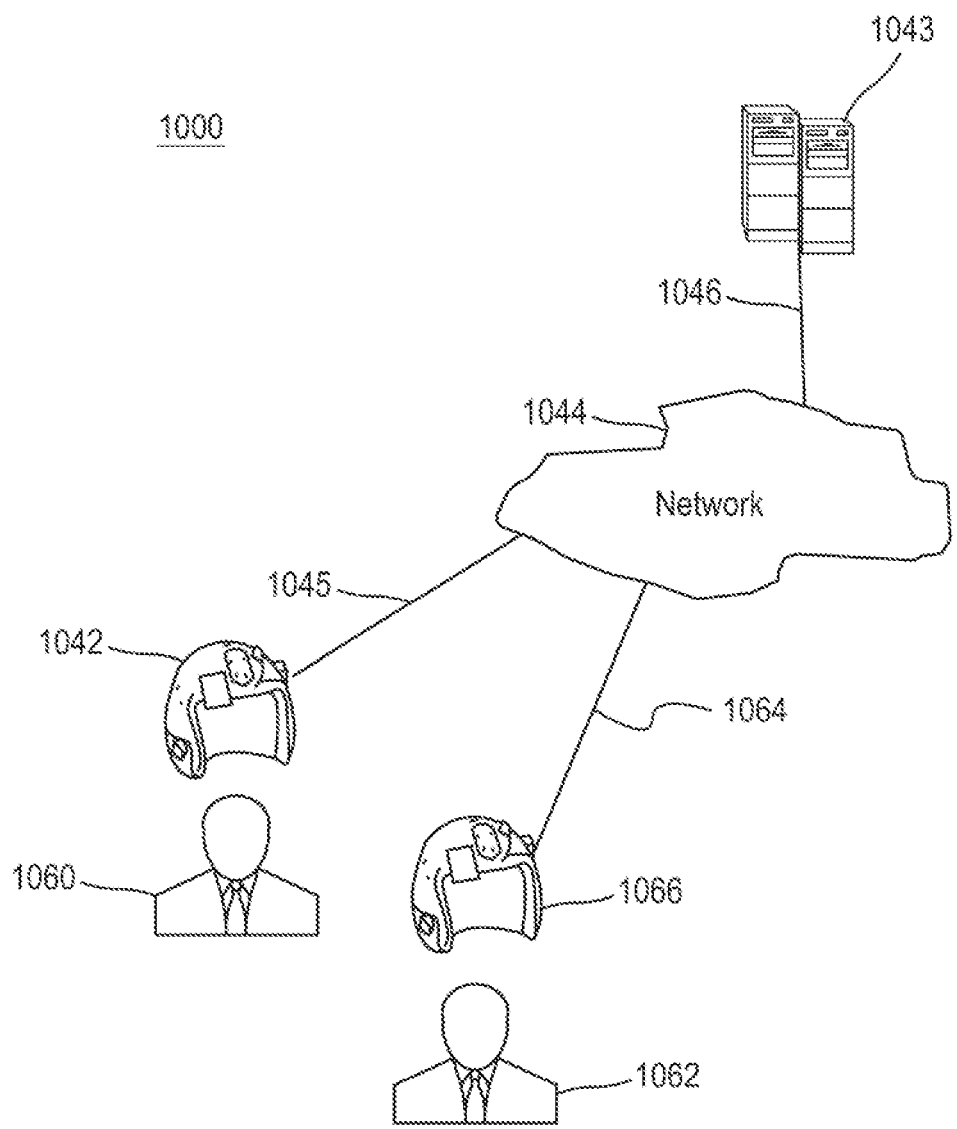
FIG. 5 is a block diagram illustrating various example system components for use in accordance with aspects of the present disclosure.

FIG. 5 illustrates a block diagram of various example system components that may be used in accordance with aspects of the present disclosure. The system 1000 may include one or more accessors 1060, 1062 (also referred to interchangeably herein as one or more "users," such as a pilot) and one or more terminals 1042, 1066 (such terminals may be or include, for example, various features of the IMUs, displays, INS, and/or related processing within other components in the helmet of FIGS. 1-3) within an overall aircraft or other vehicle network. In one aspect, data for use in accordance with aspects of the present disclosure is, for example, input and/or accessed by accessors 1060, 1062 via terminals 1042, 1066, coupled to a server 1043, such as the symbols, IMUs, displays, INS, and/or related processing within other components in the helmet of FIGS. 1-3, and/or other device having a processor and a repository for data and/or connection to a repository for data, via, for example, a network 1044, such as the Internet, an intranet, and/or an aircraft communication system, and couplings 1045, 1046, 1064. The couplings 1045, 1046, 1064 include, for example, wired, wireless, or fiber optic links. In another example variation, the method and system in accordance with aspects of the present disclosure operate in a stand-alone environment, such as on a single terminal.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example variations, the functions described above may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes CD, laser disc, optical disc, digital versatile disc (DVD), and floppy disk, where disks usually reproduce data magnetically, while discs reproduce data optically with lasers. Combinations of the above should also be included within the scope of computer-readable media.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous disclosure is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C. B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus, comprising:
   a display comprising a first sensor mounted on a headband, headgear, or helmet; and
   a second sensor mounted on the headband, headgear, or helmet and configured to transfer align with the first sensor.

2. The apparatus of claim 1, wherein the first sensor and the second sensor each comprises at least one inertial measurement unit (IMU).

3. The apparatus of claim 1, wherein the display is a head mounted display (HMD) configured to display at least one of a symbol, an icon, or an image in a monocular arrangement.

4. The apparatus of claim 1, further comprising a vehicle comprising an inertial navigation system (INS) or IMU configured to transfer align with at least one of the first sensor and the second sensor mounted to the headband, headgear, or helmet.

5. The apparatus of claim 4, wherein the vehicle is an aircraft, and wherein a fiducial constellation is mounted to a canopy of the aircraft for additional alignment of the first sensor or the second sensor to the aircraft.

6. The apparatus of claim 1, further comprising a second display comprising a third sensor configured to transfer align with at least one of the first sensor and the second sensor.

7. The apparatus of claim 6, wherein the second sensor and third sensor compare the transfer alignment to the first sensor to determine when there is an error in the transfer alignment.

8. The apparatus of claim 6, wherein the first display and the second display comprise a see-through head mounted display (HMD) and are configured to display at least one of symbols, icons, or images in a binocular or biocular arrangement.

9. The apparatus of claim 1, wherein to transfer align, the second sensor is configured to determine a transform between a first coordinate system associated with the first sensor and a second coordinate system associated with the second sensor.

10. The apparatus of claim 9, wherein to determine the transform the second sensor is configured to transform a first translation or a first rotation in the first coordinate system into a second translation or a second rotation in the second coordinate system.

11. A method for auto-alignment of components of a headband, headgear, or helmet, the method comprising:
receiving a first orientation from a first sensor mounted to the headband, headgear, or helmet;
receiving a second orientation from a second sensor mounted to the headband, headgear, or helmet; and
transfer aligning the first sensor with the second sensor based on the first orientation and the second orientation.

12. The method of claim 11, wherein:
receiving the first orientation comprises receiving the first orientation from a first inertial measurement unit (IMU) of the first sensor; and
receiving the second orientation comprises receiving the second orientation from a second IMU of the second sensor.

13. The method of claim 11, further comprising displaying, via a head mounted display (HMD) associated with the first sensor, at least one of a symbol, an icon, or an image in a monocular arrangement.

14. The method of claim 11, further comprising:
receiving a third orientation from an inertial navigation system (INS) or IMU of an aircraft;
transfer aligning with at least one of the first sensor and the second sensor based at least on the third orientation.

15. The method of claim 14, further comprising monitoring a fiducial constellation mounted to a canopy of the aircraft for additional alignment of the first sensor or the second sensor to the aircraft.

16. The method of claim 11, further comprising:
receiving a third orientation from a third sensor mounted to the headband, headgear, or helmet; and
transfer aligning the third sensor with at least one of the first sensor or the second sensor.

17. The method of claim 16, further comprising:
comparing, by the second sensor and third sensor, the transfer alignment to the first sensor; and
determining whether there is an error in the transfer alignment based on the comparison.

18. The method of claim 16, further comprising displaying, via a head mounted display (HMD) associated with the first sensor and the third sensor, at least one of a symbol, an icon, or an image in a binocular or biocular arrangement.

19. The method of claim 11, wherein transfer aligning comprises determining a transform between a first coordinate system associated with the first sensor and a second coordinate system associated with the second sensor.

20. The method of claim 19, wherein determining the transform comprises transforming a first translation or a first rotation in the first coordinate system into a second translation or a second rotation in the second coordinate system.

* * * * *